(12) United States Patent
Hart et al.

(10) Patent No.: US 7,953,097 B2
(45) Date of Patent: May 31, 2011

(54) NEIGHBOUR DISCOVERY PROTOCOL MEDIATION

(75) Inventors: Neil Hart, Chelsea (CA); Andrew Dolganow, Kanata (CA)

(73) Assignee: Alcatel Lucent, Paris (FR)

(*) Notice: Subject to any disclaimer, the term of this patent is extended or adjusted under 35 U.S.C. 154(b) by 72 days.

(21) Appl. No.: 12/351,607

(22) Filed: Jan. 9, 2009

(65) Prior Publication Data

US 2010/0177774 A1    Jul. 15, 2010

(51) Int. Cl.
*H04L 12/28* (2006.01)

(52) U.S. Cl. .................. 370/395.54; 370/235; 370/353; 370/401; 709/249

(58) Field of Classification Search .......... 370/221–228, 370/231, 235, 241–245, 256, 353, 389, 395.2, 370/395.3, 395.53, 395.54, 401, 402, 403, 370/463–469; 709/218, 224, 249
See application file for complete search history.

(56) References Cited

U.S. PATENT DOCUMENTS

| | | | |
|---|---|---|---|
| 7,009,983 B2 * | 3/2006 | Mancour | 370/401 |
| 7,386,010 B2 * | 6/2008 | Solomon et al. | 370/466 |
| 7,386,605 B2 * | 6/2008 | Shah | 709/221 |
| 7,619,966 B2 * | 11/2009 | Lee | 370/218 |
| 2006/0187858 A1 * | 8/2006 | Kenichi et al. | 370/254 |

OTHER PUBLICATIONS

Shah et al.; ARP Mediation for IP Interworking of Layer 2 VPN; Feb. 2008; Internet Draft, pp. 1-26.*
Plummer, D. ,"An Ethernet Address Resolution Protocol", Network Working Group, Nov. 1982.
Shah, H. et al., ARP Mediation for IP Interworking of Layer 2 VPN, L2VPN Working Group, Feb. 2008.
Bryant S., et al., Pseudo Wire Emulation Edge-to-Edge (PWE3) Architecture, Overture Networks, Inc., Mar. 2005.
Narten, T. et al., Neighbor Discovery for IP version 6 (IPv6), Network Working Group, Sep. 2007.
Himanshu Shah, "ARP Mediation for IP Interworking of Layer 2 VPN" Internet Engineering Task Force, vol. 12, No. 9, 2008, pp. 1-26.
Thaler, "Neighbor Discovery Proxies" Internet Engineering Task Force, Apr. 2006, pp. 1-19.

* cited by examiner

*Primary Examiner* — Pankaj Kumar
*Assistant Examiner* — Mark A Mais
(74) *Attorney, Agent, or Firm* — Kramer & Amado, P.C.

(57) ABSTRACT

The invention is directed to providing NDP mediation over an IP interworking VLL. ICMPv6 Neighbor Discovery and Inverse Neighbor Discovery messages are intercepted by provider edge (PE) devices to learn both IPv6 interface addresses and link-layer addresses of customer edge (CE) devices before forwarding the messages to the CE devices, and in some cases after altering the messages to make them more meaningful to the receiving CE devices. In this manner, the CE device interface addresses do not need to be communicated over the LDP control link, as in IPv4 ARP Mediation.

11 Claims, 5 Drawing Sheets

NEIGHBOUR DISCOVERY PROTOCOL MEDIATION

FIELD OF THE INVENTION

The invention is directed to data communication networks, particularly those using Internet Protocol version 6 (IPv6).

BACKGROUND OF THE INVENTION

Internet Engineering Task Force (IETF) RFC4861 specifies the Neighbor Discovery Protocol (NDP) for IPv6. IPv6 nodes on the same link use NDP to discover each other's presence, to determine each other's link-layer addresses, to find routers, and to maintain reachability information about the paths to active neighbors. IETF RFC826 specifies the Address Resolution Protocol (ARP), which finds an analogous use to NDP but with respect to link-layer address discovery for IPv4 nodes.

Virtual Leased Line (VLL) is a service for providing Ethernet based point to point communication over Internet Protocol (IP) and Multi Protocol Label Switching (MPLS) networks (IP/MPLS). This technology is also referred to as Virtual Private Wire Service (VPWS) or Ethernet over MPLS (EoMPLS). The VPWS service provides a point-to-point connection between two Customer Edge (CE) devices. It does so by binding two attachment circuits (AC) to a pseudowire that connects two Provider Edge (PE) devices, wherein each PE device is connected to one of the CE devices via one of the attachment circuits. VLL typically uses pseudowire encapsulation for transporting Ethernet traffic over an MPLS tunnel across an IP/MPLS backbone. More information on pseudowires can be found in "Pseudo Wire Emulation Edge-to-Edge (PWE3) Architecture", RFC3985, IETF, March 2005, by S. Bryant and P. Pate. When the VLL connects CE devices with dissimilar AC protocols over an IP/MPLS network, it is referred to as an IP interworking VLL.

IETF Draft "draft-ietf-l2vpn-arp-mediation-09" specifies ARP mediation for IP Interworking VLLs. ARP mediation is used when the aforementioned attachment circuits are of different link layer technologies and payloads of the frames carried over the pseudowire consist solely of IP datagrams. ARP mediation refers to the process of resolving link layer addresses when dissimilar resolution protocols are used on the attachment circuits. Part of ARP mediation requires that the IP address of a CE device's AC interface is communicated to the PE device at the far-end of the pseudowire. This is done so that a PE device can act as an ARP proxy for its locally attached CE device. An LDP control link of the pseudowire is used to exchange these IP addresses between the PE devices.

Similar to ARP mediation for IP interworking VLLs in IPv4 networks, in order to support IP interworking VLLs in IPv6 networks there is a need for a method of NDP mediation. However, since IPv6 nodes can have multiple IP addresses per AC interface, also referred to herein as IPv6 interface addresses or simply interface addresses, simply adopting a similar method as that used for ARP mediation for IP interworking VLLs is not desirable. This is because such a method would require a large amount of signaling to communicate these multiple IP addresses over the LDP control link. Therefore, there is a need to provide a method of NDP mediation that does not require the communication of CE device IPv6 interface addresses over the LDP control link.

SUMMARY OF THE INVENTION

The invention is directed to providing NDP mediation over an IP interworking VLL. Internet Control Message Protocol version 6 (ICMPv6) Neighbor Discovery (ND) and Inverse Neighbor Discovery (IND) messages are intercepted by PE devices to learn IPv6 interface addresses and link-layer addresses of CE devices before forwarding the messages to the CE devices. In some cases the messages are altered before they are forwarded to make them more meaningful to the receiving CE devices. According to this manner of NDP mediation, the CE device interface addresses do not need to be communicated over the LDP control link, as in IPv4 ARP Mediation.

Some embodiments of the invention forward NDP Neighbor Solicitation messages from a local CE device to a far-end CE device for processing thereon. These Neighbor Solicitation messages are carried over the IP interworking VLL and are adapted enroute by a far-end PE device to be compatible with a far-end attachment circuit connecting the far-end PE and CE devices. Similarly, NDP Neighbor Advertisement messages are sent from the far-end CE device over the IP interworking VLL to the local CE device for processing thereon. These Neighbor Advertisement messages are adapted enroute by a local PE device to be compatible with a local attachment circuit connecting the local PE and CE devices. Local and far-end PE devices learn interface IP addresses and link layer addresses of the local and far-end CE devices from the Neighbor Solicitation and Neighbor Advertisement messages, when any of these addresses are available in such messages.

According to an aspect of the invention a method of neighbor discovery protocol mediation over an Internet protocol interworking virtual leased line is provided. The method includes the steps of receiving a discovery message at a provider edge device of the virtual leased line, making a determination whether or not the discovery message was received from a local attachment circuit of the virtual leased line, and responsive to a determination that the discovery message was received from a local attachment circuit: inspecting the discovery message for link-layer and interface addresses, and forwarding the discovery message over a pseudowire of the virtual leased line.

In some embodiments of the invention the method further comprises, responsive to a determination that the discovery message was not received from the local attachment circuit: inspecting the discovery message for an interface address of a far-end customer edge device of the virtual leased line; altering the discovery message; and forwarding the altered discovery message to a local customer edge device over the local attachment circuit.

According to another aspect of the invention a method of performing data communications over an Internet protocol interworking virtual leased line is provided. The method comprises the steps of intercepting a discovery message sent from a first customer edge device of the virtual leased line, inspecting the discovery message to learn an address of the first customer edge device, storing the learned address, altering the discovery message, and forwarding the altered discovery message to a second customer edge device of the virtual leased line.

In some embodiments of the invention the method further comprises: receiving a data packet from the second customer edge device; retrieving the learned address from storage; replacing a destination link-layer address of the data packet with the learned address, thereby forming an altered data packet; and forwarding the altered data packet to the first customer edge device.

In some embodiments of the invention the method further comprises: receiving a data packet from the first customer edge device; retrieving the learned address from storage;

comparing a source link-layer address of the data packet to the learned address; and discarding the data packet responsive to the source link-layer address not matching the learned address.

BRIEF DESCRIPTION OF THE DRAWINGS

The foregoing and other objects, features and advantages of the invention will be apparent from the following more particular description of the preferred embodiments, as illustrated in the appended drawings, where.

In the figures like features are denoted by like reference characters.

DETAILED DESCRIPTION

Figure 1:
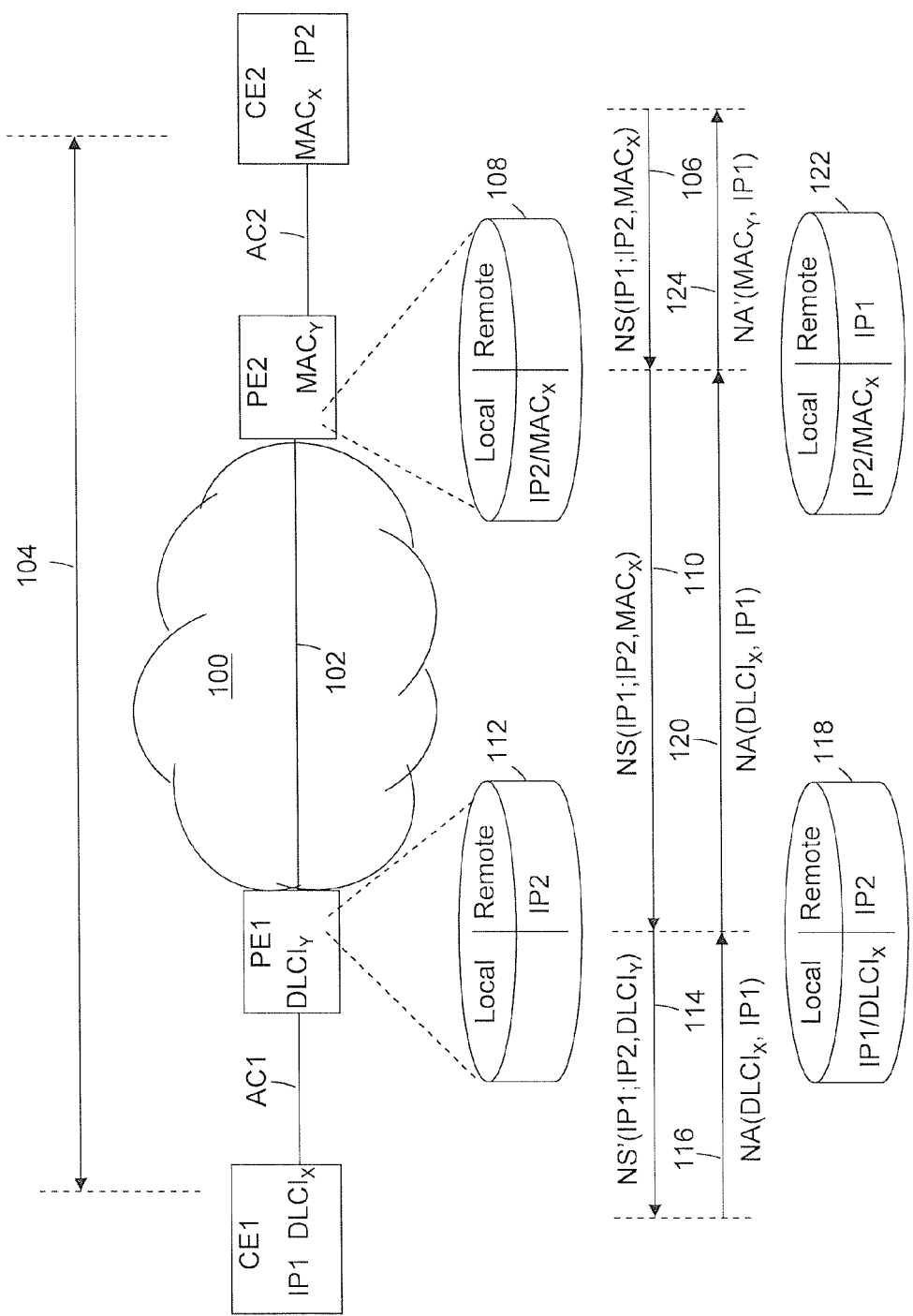
FIG. 1 illustrates NDP mediation over an IP interworking VLL according to an embodiment of the invention.

Referring to FIG. 1, an IP/MPLS Network 100 provides a pseudowire connection 102 between two PE devices PE1 and PE2. A first PE device PE1 of the PE devices is connected to a first CE device CE1 by a first attachment circuit AC1. A second PE device PE2 of the PE devices is connected to a second CE device CE2 by a second attachment circuit AC2. The first and second attachments circuits AC1 and AC2 use dissimilar link layer protocols. For example, the first attachment circuit AC1 could use the frame relay (FR) protocol and the second attachment circuit AC2 could use the Ethernet protocol. The pseudowire 102 carries data frames between the first and second PE devices PE1 and PE2, which frames have solely IP datagrams as payloads. A binding exists between the first and second attachment circuits AC1 and AC2 and the pseudowire 102 such that a point-point connection 104 is provided between the first and second CE devices CE1 and CE2. This connection is referred to as an IP interworking VLL.

The PE and CE devices of FIG. 1 are IPv6 nodes such as IP routers, or at least are nodes capable of processing ICMPv6 packets in the context of a pseudowire. For example, the first and second PE devices PE1 and PE2 could be PE routers in a Service Provider's IP/MPLS network 100. The first and second CE devices CE1 and CE2 are IPv6 nodes, for example in this case they are FR and Ethernet routers, respectively. In order to communicate IPv6 datagrams over the IP interworking VLL depicted in FIG. 1, NDP mediation is required.

NDP Mediation

An underlying principle of NDP mediation is that the PE devices PE1, PE2 should intercept ICMPv6 Neighbor Discovery and Inverse Neighbor Discovery (IND) messages, also referred to herein collectively as discovery messages. Such Neighbor Discovery messages include Neighbor Solicitation and Neighbor Advertisement messages and the IND messages include Inverse Neighbor Solicitation (INS) and Inverse Neighbor Advertisement (INA) messages. The PE devices PE1, PE2 learn both IPv6 interface addresses and link-layer addresses of the CE devices CE1, CE2 from these messages and then forward the messages to the receiving CE devices CE1, CE2, with modification in some cases to make the messages more meaningful to the receiving CE devices CE1, CE2. Advantageously, this learning means that the CE device interface addresses do not need to be communicated over the LDP control link, as in IPv4 ARP Mediation.

For a given point-to-point connection 104 between a pair of CE devices CE1, CE2, a PE device PE1, PE2 performs the following steps as part of NDP mediation:

1. Discover the IPv6 addresses of the locally attached CE device, together with those of the far-end CE device.
2. Intercept Neighbor Discovery and Inverse Neighbor Discovery messages received from the local CE device, learning information about the IPv6 configuration of the CE device before forwarding the messages across the pseudowire 102 to the far-end PE device.
3. Intercept Neighbor Discovery and Inverse Neighbor Discovery messages received over the pseudowire 102 from the far-end PE device, possibly modifying them before forwarding to the local CE device, and also learning information about the IPv6 configuration of the far-end CE device.

Throughout this description, it is assumed that the Attachment Circuit on each PE device PE1, PE2 is a point-to-point connection to a single CE device CE1, CE2 respectively. That CE device may be a host or, more likely, a router with a number of hosts 'behind' it, but it is assumed that there is a single CE device link-layer address on each Attachment Circuit that corresponds to some number of IPv6 interface addresses on the CE device.

Referring again to FIG. 1, assume for example that AC1 is a Frame-Relay Attachment Circuit, while AC2 is an Ethernet Attachment Circuit. Assume also that a first Neighbor Discovery message sent 106 after the pseudowire 102 becomes operational is a Neighbor Solicitation message NS from the second CE device CE2. The Neighbor Solicitation message NS provides a link-layer address MACx of the second CE device CE2. When the Neighbor Solicitation message NS reaches the second PE device PE2, it is intercepted there enabling the second PE device PE2 to learn 108 the link-layer address MACx of second CE device CE2 and at least one IPv6 interface address IP2 for the second CE device CE2 from the Neighbor Solicitation message NS. The second PE device PE2 forwards 110 the Neighbor Solicitation message NS to the first PE device PE1 which also intercepts it. The first PE device PE1 learns 112 at least one IPv6 interface address IP2 for the second CE device CE2 from the Neighbor Solicitation message NS, and then removes the link-layer address MACx (which is an Ethernet address) from the Neighbor Solicitation message NS and replaces it with its own link-layer address DLCIy (which is a Frame-Relay DLCI identifier), thereby forming an altered Neighbor Solicitation message NS'. The altered Neighbor Solicitation message NS' is then forwarded 114 to the first CE device CE1 for processing.

Assuming that the altered Neighbor Solicitation message NS' is a valid solicitation for one of the first CE device's CE1 IPv6 interface addresses IP1, the first CE device CE1 will respond 116 with a Neighbor Advertisement message NA containing the first CE device's link-layer address DCLIx and at least one of the first CE device's CE1 IPv6 interface addresses IP1. The first PE device PE1 intercepts the Neighbor Advertisement message NA and learns 118 from it at least one IPv6 interface address IP1 of the first CE device CE1 and the CE device's link-layer address DCLIx. The first PE device PE1 then forwards 120 the Neighbor Advertisement message NA over the pseudowire 102 to the second PE device PE2.

The second PE device PE2 intercepts the Neighbor Advertisement message NA and learns 122 from it at least one IPv6 interface address IP1 of the first CE device CE1. The first PE device PE1 replaces the first CE device's link-layer address DCLIx (which is a Frame Relay DLCI identifier) with a link-layer address MACy (which is an Ethernet Address) of its interface on the second attachment circuit AC2, thereby forming an altered Neighbor Advertisement message NA'. The second PE device PE2 forwards 124 the altered Neighbor Advertisement message NA' to the second CE device CE2. At the end of this process, both CE devices CE1, CE2 have confirmed an IPv6 interface address of each other, and the second PE and CE devices PE2, CE2 have learned a link-layer address of each other, which they can then use in passing customer data packets between the first and second CE devices CE1, CE2.

Functionality of Provider Edge Devices

Each PE device PE1, PE2 is assumed to have a single Attachment Circuit AC1, AC2 for a given NDP mediation function, and a single outgoing pseudowire 102 connected to a far-end PE device PE2, PE1. Each PE device PE1, PE2 has functionality for intercepting ICMPv6 Neighbor Discovery messages, whether received over its corresponding Attachment Circuit AC1, AC2 or over the pseudowire 102; inspecting the Neighbor Discovery messages to learn IPv6 interface addresses and CE device link-layer addresses of CE devices CE1, CE2 connected to the attachment circuits AC1, AC2; modifying the Neighbor Discovery messages, and then forwarding the modified Neighbor Discovery messages in a forward direction. Therefore, each PE device PE1, PE2 has the functionality to learn a list of IPv6 interface addresses of its directly-attached CE device CE1, CE2 and another list for far-end CE device CE2, CE1. Each PE device PE1, PE2 has the functionality to learn the link-layer address of its locally attached CE device CE1, CE2 and to use that link-layer address when forwarding traffic to the locally attached CE device CE1, CE2. Each PE device PE1, PE2 may also have the functionality to monitor the source link-layer address of data packets received from its locally attached CE device CE1, CE2, and to discard packets not matching the learned link-layer address of that CE device CE1, CE2. Each PE device PE1, PE2 also has functionality for generating any packets required to interwork between the Neighbor Discovery and Inverse Neighbor Discovery protocols. The aforementioned PE device functionality can be implemented in hardware or in various combinations of hardware and software including a microprocessor running a software program and field programmable gate arrays FGPAs.

Processing of Neighbor Solicitations

Figure 2:
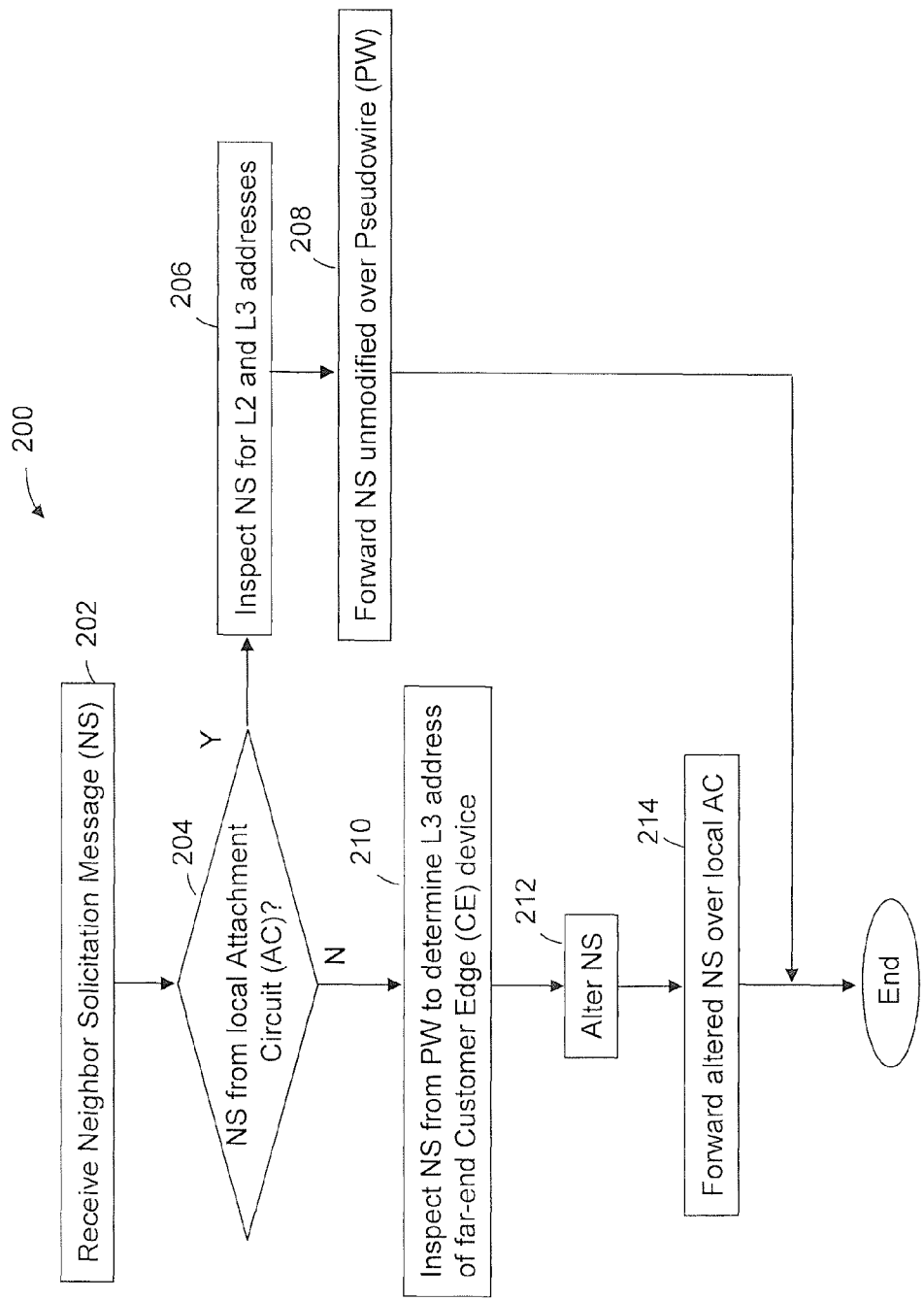
FIG. 2 illustrates a method of processing a Neighbor Solicitation message according to the NDP mediation depicted in FIG. 1.

Referring to FIG. 2 and with regard to the network configuration of FIG. 1, a method 200 of processing a Neighbor Solicitation message received at a PE device will now be described. The Neighbor Solicitation message is received 202 and a determination 204 whether or not the message came from the local Attachment Circuit is made. In the affirmative, the message is inspected 206 to learn any IPv6 interface addresses and link-layer address provided therein. The message is then forwarded 208 over the pseudowire unmodified. However, if the Neighbor Solicitation message was received over the pseudowire, the message is inspected 210 to learn an IPv6 interface address for the far-end CE device. An altered Neighbor Solicitation message is formed 212 by making any required and desired optional alterations before forwarding 214 the altered message to the local CE device. For example, if a source link-layer address option is present, the PE device removes it. The PE device may substitute an appropriate link-layer address option, e.g. by specifying its own link-layer address of the local AC. Note that if the local AC is Ethernet, failure to substitute a link-layer address option may mean that the local CE device will have no valid link-layer address with which to transmit data packets.

Processing of Neighbor Advertisements

Figure 3:
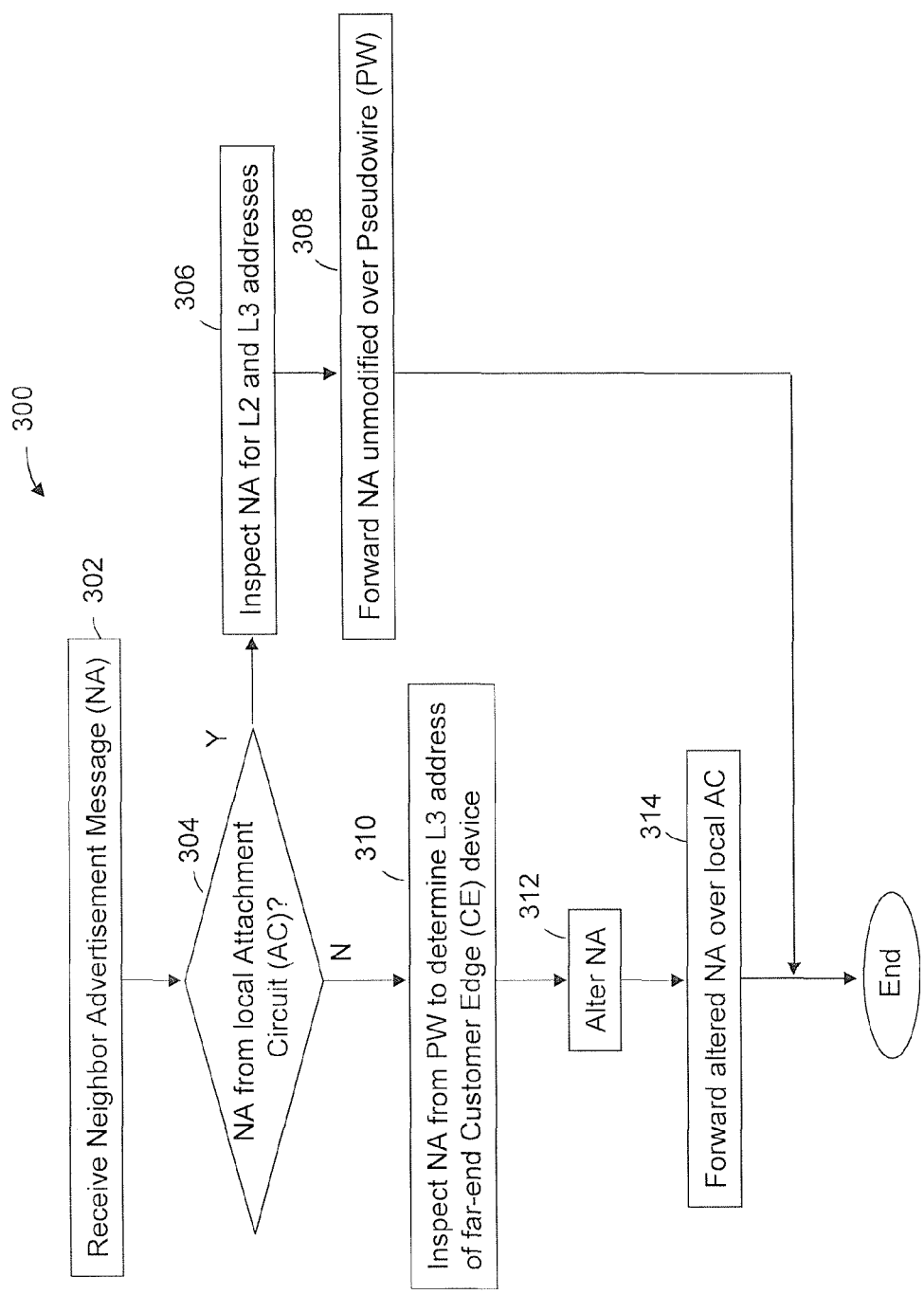
FIG. 3 illustrates a method of processing a Neighbor Advertisement message according to the NDP mediation depicted in FIG. 1.

Referring to FIG. 3 and with regard to the network configuration of FIG. 1, a method 300 of processing a Neighbor Advertisement message received at a PE device will now be described. The Neighbor Advertisement message is received 302 and a determination 304 whether or not the message came from the local Attachment Circuit is made. In the affirmative, the message is inspected 306 to learn any IPv6 interface addresses and link-layer address provided therein. The message is then forwarded 308 over the pseudowire unmodified. However, if the Neighbor Advertisement message was received over the pseudowire, the message is inspected 310 to learn an IPv6 interface address for the far-end CE device. An altered Neighbor Advertisement message is formed 312 by making any required and desired optional alterations before forwarding 314 the altered message to the local CE device. For example, if a source link-layer address option is present, the PE device removes it. The PE device may substitute an appropriate link-layer address option, e.g. by specifying its own link-layer address of the local AC. Note that if the local AC is Ethernet, failure to substitute a link-layer address option may mean that the local CE device will have no valid link-layer address with which to transmit data packets.

One will note that the methods of processing Neighbor Solicitation and Advertisement messages in general involve the same steps applied to their respective type of Discovery message.

Processing of Inverse Neighbor Solicitations

Figure 4:
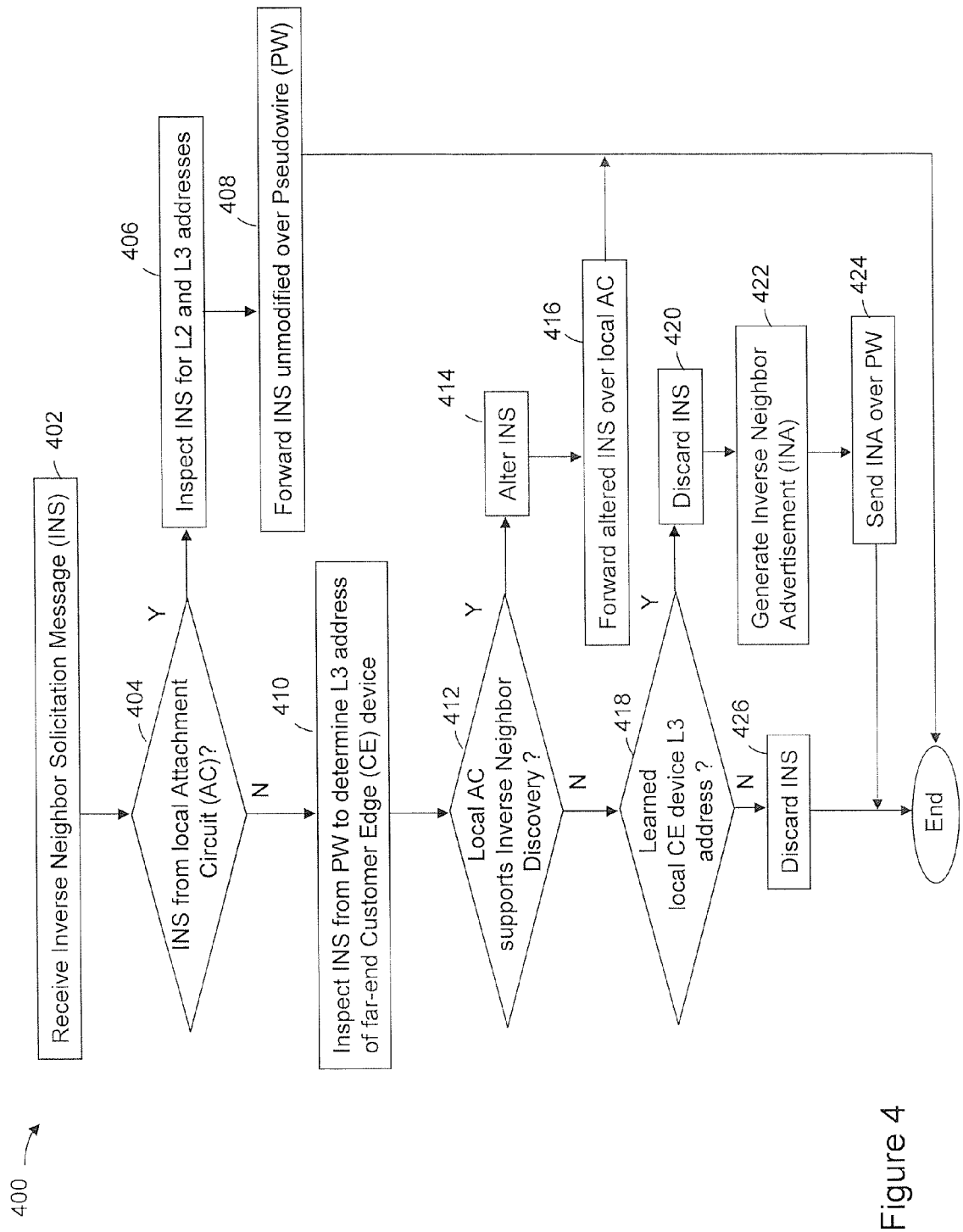
FIG. 4 illustrates a method of processing an Inverse Neighbor Solicitation message according to the NDP mediation depicted in FIG. 1.

Referring to FIG. 4 and with regard to the network configuration of FIG. 1, a method 400 of processing an Inverse Neighbor Solicitation message received at a PE device will now be described. The Inverse Neighbor Solicitation message is received 402 and a determination 404 whether or not the message came from the local Attachment Circuit is made. In the affirmative, the message is inspected 406 to learn any IPv6 interface addresses and link-layer address provided therein. The message may optionally contain a list of interface addresses for the local CE device and these are also learned. The message is then forwarded 408 over the pseudowire unmodified. However, if the Inverse Neighbor Solicitation message was received over the pseudowire, the message is inspected 410 to learn one or more IPv6 interface addresses of the far-end CE device. A determination 412 whether or not the local AC supports Inverse Neighbor Discovery (e.g., a Frame Relay AC) is made. In the affirmative, an altered Inverse Neighbor Discovery message is formed 414 by making any required and desired optional alterations before forwarding 416 the altered message to the local CE device. Such alterations include modifying the link-layer address options to match the local Attachment Circuit. However, if the local AC does not support Inverse Neighbor Discovery, processing of the message depends on whether the PE device has learned at least one interface address for its local CE device. A determination 418 is made to this effect. If the PE device has learned at least one interface address for the local CE device, the PE device discards 420 the Inverse Neighbor Solicitation message, generates 422 an Inverse Neighbor Advertisement message and sends 424 the INA message back into the pseudowire. The destination address of the INA message is the source address from the INS message. The source address of the INA message is one of the CE device's interface addresses, and all of the CE device's interface addresses that have been learned so far by the PE device are included in the Target Address List.

The Source and Target Link-Layer addresses are copied from the INS. However, if the PE device has not yet learned at least one interface address for its local CE device, the INS message is silently discarded 426. This processing continues until the PE device learns an address from the CE device (through receiving, for example, a Neighbor Solicitation message). After this learning has occurred, the PE device will be able to respond to INS messages received over the pseudowire.

Processing of Inverse Neighbor Advertisements

Figure 5:
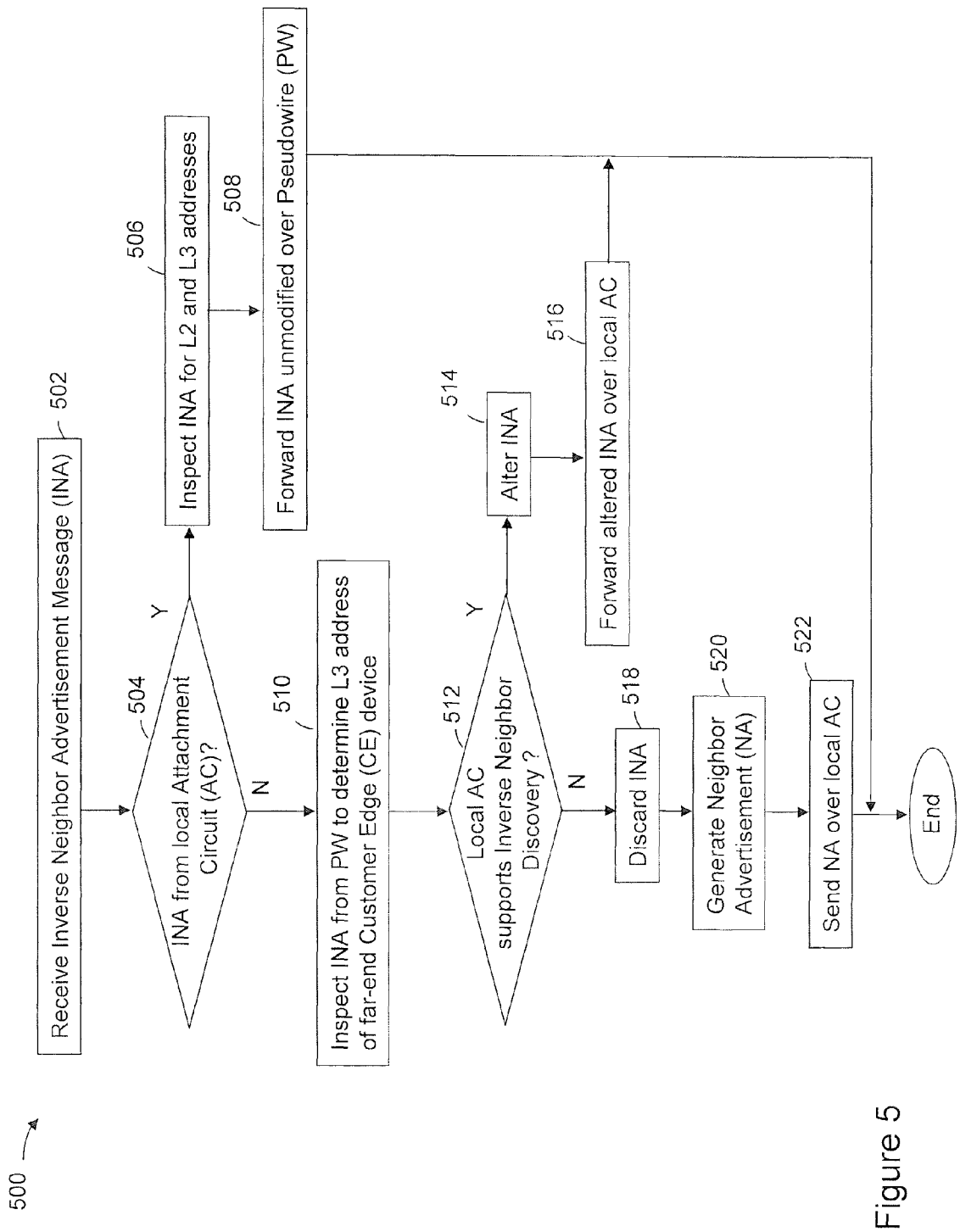
FIG. 5 illustrates a method of processing an Inverse Neighbor Advertisement message according to the NDP mediation depicted in FIG. 1.

Referring to FIG. 5 and with regard to the network configuration of FIG. 1, a method 500 of processing an Inverse Neighbor Advertisement message received at a PE device will now be described. An Inverse Neighbor Advertisement message is received 502 and a determination 504 whether or not the message came from the local Attachment Circuit is made. In the affirmative, the message is inspected 506 to learn one or more interface addresses of the local CE device. The message is then forwarded 508 over the pseudowire unmodified. However, if the Inverse Neighbor Advertisement message was received over the pseudowire, the message is inspected 510 to learn one or more IPv6 interface addresses of the far-end CE device. A determination 512 whether or not the local AC supports Inverse Neighbor Discovery (e.g., a Frame Relay AC) is made. In the affirmative, an altered Inverse Neighbor Advertisement message is formed 514 by making any required and desired optional alterations before forwarding 516 the altered message to the local CE device. However, if the local AC does not support Inverse Neighbor Discovery, the PE device discards 518 the INA message, generates 520 a Neighbor Advertisement message, and sends 522 the NA message towards its local CE device. The source interface address of the NA message is the source interface address from the INA message, the destination interface address of the NA message is the destination interface address from the INA message, and the source link-layer address of the NA message is that of the local AC on the PE device.

Processing of Router Solicitations

A Router Solicitation message received on an AC from a CE device should be inspected to determine an interface address for the CE device, and, if present, the link-layer address of the CE. The Router Solicitation message should then be forwarded unmodified over the pseudowire. A Router Solicitation received over the pseudowire should be inspected to determine an interface address for the far-end CE device. If a source link-layer address option is present, the PE device removes it. The PE device may substitute a source link-layer address option specifying the link-layer address of its AC. The Router Solicitation message is then forwarded to the local CE device.

Processing of Router Advertisements

A Router Advertisement message received on an AC from a CE device should be inspected to determine an interface address for the CE, and, if present, the link-layer address of the CE. The Router Advertisement message should then be forwarded unmodified over the pseudowire. A Router Advertisement message received over the pseudowire should be inspected to determine an interface address for the far-end CE device. If a source link-layer address option is present, the PE device removes it. The PE device may substitute a source link-layer address option specifying the link-layer address of its AC. If a Maximum Transmission Unit (MTU) option is present, the PE device may reduce the specified MTU if the MTU of the pseudowire is less than the value specified in the option. The Router Advertisement message is then forwarded to the CE.

Duplicate Address Detection

Duplicate Address Detection allows IPv6 hosts and routers to ensure that the addresses assigned to interfaces are unique on a link. As with all Neighbor Discovery messages, those used in Duplicate Address Detection will simply flow through the pseudowire, being inspected at the PE devices at each end. Processing is performed as above (e.g., removing/substituting source link-layer addresses, if present). However, the source address of Neighbor Solicitation messages used in Duplicate Address Detection is the unspecified address, so the PE devices can't learn the CE device's interface address.

Signaling Between PE Devices

Since far-end CE device interface addresses are learned by intercepting ICMPv6 Neighbor Discovery packets flowing through the pseudowire, rather than by out-of-band signaling from the far-end PE, there are no special requirements on the LDP signaling between the PE devices. In fact, it would be possible to statically configure the pseudowire labels to be used by each PE device, and the NDP mediation pseudowire could still operate correctly, intercepting ICMPv6 packets flowing between the two PE devices. It is, however, more likely that the pseudowire will be established using the Label Distribution Protocol (LDP) as in [RFC4447]. The encapsulation type of the pseudowire should be IP Layer2 Transport (the value 0×0008, as defined in [PWE3-IANA]). Note that this pseudowire may also be carrying IPv4 traffic, using the mechanisms described in [ARP-MED] to communicate the CE device IPv4 addresses using the IP Address List TLV. If the pseudowire is only carrying IPv6 traffic, the address specified in the IP Address List TLV will always be zero. If the pseudowire is carrying both IPv4 and IPv6 traffic, the mechanisms described herein and in [ARP-MED] should not overlap. In particular, just because a PE device has learned a link-layer address for IPv6 traffic by intercepting a Neighbor Advertisement from it's local CE device, it should not assume that it can use that link-layer address for IPv4 traffic until that fact is confirmed by reception of, for example, an IPv4 ARP message from that CE device.

Numerous modifications, variations and adaptations may be made to the embodiment of the invention described above without departing from the scope of the invention, which is defined in the claims.

What is claimed is:

1. A method of neighbor discovery protocol mediation over an Internet Protocol (IP) interworking virtual leased line, the method comprising:
   receiving a ICMPv6 discovery message at a Provider Edge (PE) device of the virtual leased line, wherein the PE device is a IPv6 node;
   making a determination whether or not the ICMPv6 discovery message was received from a local attachment circuit of the virtual leased line; and
   responsive to a determination that the ICMPv6 discovery message was not received from a local attachment circuit:
   altering the ICMPv6 discovery message; and
   forwarding the altered ICMPv6 discovery message to a local Customer Edge (CE) device over the local attachment circuit, wherein the CE device is a IPv6 node.

2. The method of claim 1, further comprising:
   inspecting the ICMPv6 discovery message for an interface address of a far-end CE device of the virtual leased line.

3. The method of claim 2, wherein the ICMPv6 discovery message is a neighbor discovery message.

4. The method of claim 3, wherein the step of altering further comprises:

removing source link-layer address information from the neighbor discovery message.

5. The method of claim 4, wherein the step of altering further comprises:
inserting a link-layer address of the local attachment circuit at the PE device into the neighbor discovery message as source link-layer address information.

6. The method of claim 2, wherein the ICMPv6 discovery message is an inverse neighbor discovery message and the step of inspecting the ICMPv6 discovery message for the interface address of the far-end CE device further comprises:
making a determination whether or not the local attachment circuit supports an inverse neighbor discovery protocol; and
responsive to a determination that the local attachment circuit does support the inverse neighbor discovery protocol, proceeding to the step of altering the ICMPv6 discovery message.

7. The method of claim 6, wherein the discovery message is an inverse neighbor advertisement message and the step of inspecting the ICMPv6 discovery message for the interface address of the far-end CE device further comprises:
responsive to a determination that the local attachment circuit does not support the inverse neighbor discovery protocol:
discarding the inverse neighbor advertisement message;
generating a neighbor advertisement message; and
sending the neighbor advertisement message to the local CE device over the local attachment circuit.

8. The method of claim 6, wherein the discovery message is an inverse neighbor solicitation message and the step of inspecting the discovery message for the IPv6 interface address of the far-end CE device further comprises:
responsive to a determination that the local attachment circuit does not support the inverse neighbor discovery protocol:
discarding the inverse neighbor solicitation message; and
responsive to the PE device having learned at least one interface address of the local CE device:
generating an inverse neighbor advertisement message; and
sending the inverse neighbor advertisement message to the far-end CE device over the pseudowire.

9. A method of performing data communications over an Internet Protocol (IP) interworking virtual leased line, comprising the steps of:
intercepting a ICMPv6 discovery message sent from a first CE device of the virtual leased line, wherein the first CE device is a IPv6 node;
inspecting the ICMPv6 discovery message to learn an address of the first CE device;
storing the learned address;
altering the ICMPv6 discovery message; and
forwarding the altered ICMPv6 discovery message to a second CE device of the virtual leased line.

10. The method of claim 9 wherein the learned address is a link-layer address, the method further comprising:
receiving a ICMPv6 data packet from the second CE device;
retrieving the learned address from storage;
replacing a destination link-layer address of the ICMPv6 data packet with the learned address, thereby forming an altered ICMPv6 data packet; and
forwarding the altered ICMPv6 data packet to the first CE device.

11. The method of claim 9 wherein the learned address is a link-layer address, the method further comprising:
receiving a ICMPv6 data packet from the first CE device;
retrieving the learned address from storage;
comparing a source link-layer address of the ICMPv6 data packet to the learned address; and
discarding the ICMPv6 data packet responsive to the source link-layer address not matching the learned address.

* * * * *